United States Patent Office 3,360,375
Patented Dec. 26, 1967

3,360,375
YEAST LEAVENED BAKERY PRODUCTS AND SHORTENING COMPOSITIONS
Bruce D. Buddemeyer and John R. Moneymaker, Overland Park, Kans., assignors to The Paniplus Company, Kansas City, Mo., a corporation of Missouri
No Drawing. Filed May 16, 1967, Ser. No. 638,724
49 Claims. (Cl. 99—91)

ABSTRACT OF THE DISCLOSURE

Yeast leavened bakery products and shortening compositions having incorporated therein about 0.05 to 2.0 percent by weight of a non-toxic, mono alkyl ester of a dicarboxylic acid.

This application is a continuation-in-part of applications Serial No. 341,422 filed January 30, 1964; Serial No. 341,411 filed January 30, 1964; Serial No. 361,556 filed April 21, 1964; Serial No. 601,315 filed December 13, 1966 which is a divisional application of Serial No. 361,556 filed April 21, 1964; and Serial No. 557,844 filed June 15, 1966 which is a continuation-in-part of Serial No. 341,423 filed January 30, 1964 and now abandoned.

This invention relates to novel fatty alcohol derivatives of dicarboxylic acids which have been found to possess unique properties as improving agents in food products.

More particularly, this invention relates to dough products containing flour as a major ingredient, and more particularly to yeast leavened baked goods having enhanced physical and baking characteristics.

Bread is illustrative of the larger class of yeast leavened dough products to which this invention pertains, and is the most important of such products commercially.

Bread is a highly competitive product produced by a very competitive industry for a discriminating public. It is the oldest man-made food and, while it is not a glamorous one, it is found in every household in America.

Basically bread is made from flour, yeast, water, salt and lard, plus various miscellaneous ingredients. In the modern bakery, the above ingredients undergo severe mechanical mixing to become a fully developed dough. This dough must inherently possess the characteristics necessary to produce a good loaf of bread, with a high degree of product uniformity. To achieve such a dough, the baker ordinarily relies on aids such as bread improvers to provide "tolerance" in his production. The range of this tolerance is very narrow one without the help of bread improvers, so narrow in fact that the normal natural variability of such raw ingredients as flour, which constitutes the bulk of a loaf of bread, and lard, can seriously affect the quality of his product. In view of the trend toward larger and more efficient bakeries, the seriousness of low production tolerance cannot be overemphasized.

Expanded bread and continuous mix constitute two significant recent innovations in bread technology which have been made to meet the demands of the American housewife for a low cost, soft, resilient, close grained loaf of bread with very little crust.

In adopting modern breadmaking procedures and machinery of the type described, however, the baker has compounded his production problems, since such technological innovations subject the dough to much greater strains before becoming a loaf of bread than have heretofore been encountered.

For example, in modern breadmaking procedures and machinery of the type described, the dough has to be highly tolerant to mechanical punishment. Thus, the dough must be more extensible to retain the gas produced in fermentation more effectively. It must have strength so that as it rises it will expand in volume freely and yet not collapse when handled. When it is baked it must attain and retain a symmetrical and uniform appearance. As it cools it must retain the size, shape, and internal characteristics it acquired as it was baked.

Later when it is sliced and wrapped the bread products of today's modern bakery are subjected to further endurance tests. In the high speed band slicer of today, they must slice cleanly, without either gumming up the blades, tearing the crumb, or collapsing. When wrapped, the modern loaf of bread must have sufficient strength to be handled, fresh and soft as it is, without after effects. A crushed loaf of bread cannot be sold. During delivery to the retailer it must show a great deal of resistance to damage by crushing and handling. For instance, the bread may be stacked for display but each loaf has to be strong enough not to lose its original characteristics. To achieve the desirable properties described, each ingredient in the dough must be pushed to the extreme of its capabilities.

With the coming of continuous mix and expanded loaf, flour characteristics have been studied very carefully. These studies reveal that flour varies naturally to an extent sufficient to cause lack of uniformity in the product of modern bakeries. The baker however cannot afford a tailored flour, and therefore some provision must be made to compensate for the natural variation in flour properties. Shortening or lard has also been found to be non-uniform in quality, and here again something must be done to offset this lack of uniformity. The structure of dough relies on a gluten network provided by the flour lubricated by a thin lipid layer. Continuous mix has increased the dispersion of this lipid in the dough by its intense mechanical action. The bread reflects this mechanical action in its fine grain. However, this fine grain is gained at the expense of the cell wall strength of the bread. These become very thin and delicate and the gluten skeleton is severely tested. When a poor quality lipid is used the gluten loses its elasticity and bread quality falls off.

As will be seen from the foregoing, the baker in improving his equipment and his technology, has had to wage a constant battle to maintain and improve quality.

An object of the present invention is to assist the baker to maintain and improve the quality of yeast leavened dough products produced in modern bakeries using technology of the type described by providing new and useful improvers for such products.

An object of this invention is to provide new and improved agents of a lipoidal nature, which, when included as ingredients of the products of the type described, considerably improve the properties and usefulness of such products.

Another object of the invention is to provide novel compositions of matter of a relatively innocuous nature for improving the properties and usefulness of bakery products.

Another object of the invention is to provide novel compounds of a lipoidal nature for addition to food products or other systems containing protein, starch and/or fats to improve the properties and usefulness thereof.

A specific object of this invention is to provide agents of a lipoidal nature for improving the properties of yeast leavened bakery products.

An additional object of this invention is to provide improved shortening compositions for bakery and food products.

The improvers of this invention, rather than aiming at specific problems in production, are intended to improve the over-all production of yeast leavened products by reacting with the basic ingredients of such products to permit fuller use of their innate but heretofore not fully developed characteristics. The bread improvers of this invention act to modify the yeast leavened dough so that, in general, it will yield a better volume, a higher quality score, and better compressibility, the enhancement of which characteristics is of great help to the modern baker.

The improvers of this invention also provide the modern baker with a wide production tolerance and improve slicing and wrapping characteristics of the finished yeast leavened baked goods.

The improvers of this invention act on the gluten to yield a smooth, more elastic, more tolerant yeast leavened dough. In the bake, in addition to helping to lubricate and modify the gluten structure, the instant improvers act on the starch to give a softer loaf, which will stay softer longer.

Yeast leavened baked goods containing the improvers described herein and possessing the enhanced characteristics described supra constitute paramount objects of this invention.

Other objects will in part be obvious and will in part be made clear from the following description.

These and other objects are attained by the utilization in products of the type described of relatively small but effective amounts of certain specific long chain alkyl mono-esters of dicarboxylic acids, and/or the salts of such esters. Such mono-esters have been found to exert an improving effect not only on the finished products themselves, but also in the processing and manufacturing of such products.

Especially suitable and preferred for use are the mono-alkyl esters, including the salts of such esters, resulting from the reaction of a fatty alcohol having 12 to 24 carbon atoms, including mixtures thereof, and a dicarboxylic acid compound having up to and including ten carbon atoms. Included within the dicarboxylic acid compounds that may be used are succinic, glutaric, adipic, fumaric, maleic, malic, azelaic, and sebacic acids, acyl halides (e.g. bromides, chlorides, iodides, fluorides) of the foregoing acids, anhydrides of the foregoing acids, and mixtures of the foregoing.

When the cis or maleic form of butenedioic acid is employed, care should be employed to convert this substituent of the mono-esters to the trans or fumaric form. This may be done by heating in the presence of hydrogen chloride, e.g. hydrogen chloride gas at elevated temperature, e.g. 100 to 130° C.

As will be made clear hereinbelow, the alkyl substituent which is generally preferred is derived from saturated fatty alcohols corresponding to the formula $C_nH_{2n+1}OH$, wherein $n$ is an integer from 12 to 24, including mixtures thereof. However, alcohols corresponding to the formulae: $C_nH_{2n-1}OH$, $C_nH_{2n-3}OH$ and $C_nH_{2n-5}OH$, wherein $n$ is an integer from 12 to 24, including mixtures thereof, have also been found to have utility in providing the alkyl substituents of the novel esters herein described, and may be used.

The mono-esters may readily be prepared by reacting such fatty alcohols with the described dicarboxylic acids, per se, or with the anhydrides or acid halides of the dicarboxylic acids. Depending upon the reactants, a solvent or solvent system may be used to facilitate intimate contact and improve reactivity of the reactant materials.

The following reaction between stearyl alcohol and adipic acid is typical of the reaction mechanism involved in forming the fatty alcohol mono-esters of dicarboxylic acids suitable for use herein.

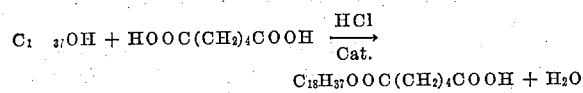

$$C_{18}H_{37}OH + HOOC(CH_2)_4COOH \xrightarrow{HCl}{Cat.}$$
$$C_{18}H_{37}OOC(CH_2)_4COOH + H_2O$$

It will be clear from the foregoing description that the mono-esters generally correspond to the formula $R^1OOCRCOOZ$, wherein $R^1$ is an aliphatic hydrocarbon substituent containing 12 to 24 carbon atoms and derived from a saturated or unsaturated alcohol; R is an aliphatic hydrocarbon group having up to and including 8 carbon atoms; and Z is a cation, e.g. hydrogen, when the compound is in the form of the free acid, and a metal when the compound is in the form of a metal salt.

R may be saturated or unsaturated, substituted (e.g., hydroxyalkyl) or unsubstituted. R may also contain an even or odd number of carbon atoms.

The mono-esters may be used in either the free acid or the salt form. Among the salts may be mentioned the alkali metal salts, such as sodium and potassium, the alkaline earth metal salts, such as calcium and magnesium, and the ammonium and aluminum salts. The alkali metal salts constitute preferred embodiments of the esters.

The acid form of the mono-esters may be converted to the ester salts by reaction in a well known manner with a hydroxide, e.g., NaOH, KOH, or salt, e.g., $CaCO_3$, of a metal whose ester salt is desired.

A small, effective amount of the mono-esters may be added to the composition formula either separately, or admixed with each other or with other ingredients.

With baked goods of the type described, the agents, if in salt form, are introduced either directly, or admixed with flour or water; if in the acid form, the agents are preferably admixed with the fatty components, and in this way introduced into the formulae for making the desired product.

Based upon the flour content of the baked products, the amount of the mon-ester will usually range up to about 2 percent, or between about 0.05 and 2.00 percent, with best results being obtained at a level of between about 0.1 and 0.5 percent.

Based upon the shortening weight of baked products, the amount of the addition agent may vary between about 0.05 and 20.00 percent by weight, and preferably between about 0.25 and 5 percent.

Shortenings or other lipoidal materials with which the addition agents of the present invention may be combined for subsequent incorporation into the baked goods are of the usual type, and in general are triglyceride oils or fats derived from animal sources such as lard or tallow and from plant sources such as the seed oils of corn, cotton, soy and the like. It is normal practice, although not essential, for the shortenings to be refined and processed to improve their properties. The usual treatments include catalytic hydrogenation to improve the plasticity, increase hardness and reduce the iodine number of the fatty material, and heat treatment in the presence of alkaline catalysts, with or without added glycerine, to improve the physical properties and functionality. For instance, the plastic super-glycerinated vegetable shortenings have been hydrogenated and subjected to interesterification reactions to improve the physical characteristics and increase the content of mono- and diglycerides and to increase the emulsification properties of the shortening. Shortenings of the usual type may also contain glycerine and/or natural or hydroxylated lecithin.

When the addition agents are to be combined with shortening and/or oil, this may be done by dissolving the agents in the fatty component, and then stirring and tempering the resulting mixture. Final treatment may also include the chilling and whipping treatments of the Votator process in the case of plastic shortenings.

When the mono-esters of this invention are in the acid form, they are preferably added to the bakery formulae with the shortening. When in salt form, they will ordinarily be added in dry powdered form or emulsified with water.

Shortening compositions containing the desired amount of the mono-esters disclosed herein may be prepared and added in lieu of the usual shortening. Obviously, however, mixtures of the usual shortenings and larger amounts of the addition agent can be produced, and this admixture can be used in lieu of only a portion of the usual shortening with the same net benefits resulting, and such compositions are to be considered part of this invention.

Similarly, the addition agents may be admixed with the flour or the water, and in this form added to the formulae.

The ingredients employed in making the yeast leavened baked goods form no part of the present invention since any suitable formulae may be used. The basic ingredients used in the manufacture of yeast leavened baked goods, such as bread, are flour, water, sodium chloride and yeast. For commercial bread, yeast raised buns, rolls, and other enriched yeast raised baked goods, sugar, milk and shortening in varying amounts are conventionally added to these basic ingredients. For some enriched yeast raised, sweet dough products, such as sweet dough buns and rolls, eggs as well as other enriching agents may be added.

The term yeast as used herein is intended to mean all suitable fermentation agents ordinarily utilized in breadmaking.

The following examples are illustrative of the manner in which the additives of the present invention can be synthesized.

EXAMPLE 1

*Preparation of a mono alkyl ester of succinic acid*

A 5 liter reaction flask, equipped with a mechanical stirrer, thermometer, and pressure release valve, was charged with 6.7 moles (670.6 gms.) of commercial food grade succinic anhydride, molecular weight 100.1. The anhydride was melted by means of a heating mantle surrounding the flask and warmed to 130° C. with continuous stirring. Then, 6.1 moles (1607.4 gms.) of a commercial food grade saturated fatty alcohol (average molecular weight 263.5; approximate composition—1% $C_{12}$; 4% $C_{14}$; 32% $C_{16}$; 62% $C_{18}$; 1% $C_{20}$) was heated to melting temperature and then gradually introduced into the succinic anhydride flask over a 45 minute period, as the temperature of the reactants in the flask was increased to 150° C. After completing the addition of the fatty alcohol composition, the reaction mass was held at 150° C. with continuous stirring for 60 minutes. The product was then transferred warm to a 4 liter beaker and washed twice at 90° C. with 2 liters of saturated sodium chloride solution and finally with warm distilled water. The washed sample was allowed to solidify and then transferred to a vacuum dessicator. Under a vacuum of approximately 10 mm. Hg, the product was gradually melted by application of heat from an infrared lamp, thus effecting drying. The resultant product was a light, cream colored, soft, waxy solid at room temperature, having an acid value of 154, a saponification value of 312, and a melting point range of 63–64° C.

The following tabulation sets down the theoretical acid and saponification values and the range of values obtained from the analysis of compounds resulting from a number of syntheses.

Acid value: Theoretical, 154.3; actual, 154–162.4.
Saponification value: Theoretical, 308.6; actual, 298.7–312.

Substantially all of the reaction product is comprised of the compound $R^1OOCCH_2CH_2COOH$, wherein $R^1$ is the saturated alkyl group of the commercial fatty alcohol employed.

EXAMPLE 2

*Preparation of a mono cetyl ester of glutaric acid*

A 1 liter three-necked reaction flask, fitted with a stirrer, thermometer and pressure relief valve, was charged with 1.95 moles (222.5 gms.) of commercial glutaric anhydride, molecular weight 114.1, and warmed to 100° C. by a heating mantle. Then 1.3 moles (315.2 gms.) of practical grade 1-hexadecanol (cetyl alcohol) molecular weight 242.5, was melted and gradually introduced into the reaction flask during a 30 minute period with constant agitation. The reaction was continued for 3 hours at a temperature of 100°–110° C. The warm liquid reaction product was washed twice with hot water and then allowed to solidify. The product was dried by melting under vacuum in a dessicator equipped with an infrared heating lamp. The resultant product was a waxy solid with an acid value of 156, saponification value 306, and melting point range of 66°–67° C.

The following tabulation sets down the theoretical acid and saponification values and the range of values obtained from the analysis of compounds resulting from a number of preparations as described above.

Acid value: Theoretical, 157.3; actual, 151.5–155.7.
Saponification value: Theoretical, 314.6; actual, 306–309.

The variations observed are to a large extent due to the purity of the reagents employed in the syntheses.

Substantially all of the reaction product is comprised of the compound corresponding to the formula:

$C_{16}H_{33}OOCCH_2CH_2CH_2COOH$

EXAMPLE 3

*Preparation of a mono alkyl ester of adipic acid*

Five hundred and twenty six and one tenth (526.1) grams (3.6 moles) of commercial adipic acid, molecular weight 146.14, was weighed into a 3 liter reaction flask fitted with a mechanical stirrer, thermometer, and insulated dropping funnel. The adipic acid was warmed by means of a heating mantle controlled by a powerstat to 155° C. A fatty alcohol mixture (molecular weight 263.5) conforming the following approximate composition:

Lauryl alcohol, 1%; myristyl alcohol, 4%; cetyl alcohol, 32%; stearyl alcohol, 62%; and arichidyl alcohol, 1% was simultaneously warmed to 55° C. and introduced into an insulated dropping funnel. 790.5 grams (3.0 moles) of the fatty alcohol composition was employed. After melting the adipic acid, a catalytic amount (0.6 ml.) of hydrochloric acid was added thereto, and with stirring, the addition of the fatty alcohol composition was initiated. The addition required approximately one hour. Following the addition of the fatty alcohol, the reactor was modified by removing the dropping funnel and inserting a goose-neck and distillation condenser with graduated receiver. A vacuum line was connected to the receiver. Under a vacuum of approximately 22 inches, the reactants were warmed at a temperature of 165° C. for 5 hours. Ninety-five percent of the theoretical water of esterification was removed during this period.

The product was washed twice with saturated salt water, at melt, then placed in a 90° C. moisture oven for 2 hours. Residual salt settled to the bottom of the flask and the clear liquid product was decanted off. Moisture of the final product was found to be 0.3 percent.

The reaction product was a very light creamed color waxy solid. This material had an acid number of 115, a saponification number of 247, and a melting point of 51.5° C. Based on these values, approximately an 83 percent yield of the mono-alkyl adipic acid was obtained.

The reaction product corresponds to the formula:

$R^1OOC(CH_2)_4COOH$ wherein $R^1$ corresponds to the alkyl substituents of the commercial fatty alcohol employed.

EXAMPLE 4

*Preparation of a mono alkyl ester of fumaric acid*

A five liter three-neck round bottom reaction flask was fitted with a mechanical stirrer, thermometer and insulated dropping funnel and attached to a hydrogen chloride generator. The reactor was charged with 755.06 gms. (7.7 moles) of maleic anhydride and warmed to 100° C., using a heating mantle controlled by a Powerstat. With constant stirring, 1844.5 gms. (7.0 moles) of a fatty alcohol composition primarily composed of cetyl and stearyl alcohols as described in Example 3 above was introduced gradually into the reaction flask during a period of 30 minutes. Dry hydrogen chloride gas was bubbled into the reaction mixture during and subsequent to the addition of the alcohol. The reaction temperature was increased to 125° C. in the initial 10 minutes. The 125° C. temperature was maintained and hydrogen chloride gas addition was continued with constant stirring for 60 minutes following completion of the alcohol addition. The reaction product was then allowed to cool and stand at room temperature in the flask overnight.

The reaction product was remelted and washed twice at 90° C. with 2 liter aliquots of saturated sodium chloride solution and then vacuum dried.

The resultant product was a cream colored hard waxy solid at room temperature having the following physical and chemical properties:

Acid number: theoretical, 155.1; actual, 145.1.
Saponification number: Theoretical, 310.2; actual 297.3.
Melting point: 80–81° C.

Polargraphic analysis of samples subjected to mild saponification, a treatment which is known not to isomerize maleic acid to fumaric acid, substantiated that a substantially complete conversion of maleic anhydride (cis) to the fumarate ester (trans) was accomplished.

Thus, the reaction product corresponded substantially completely to the formula: $R^1OOCCHCHCOOH$ (trans) wherein $R^1$ corresponds to the alkyl substituents of the commercial fatty alcohol employed.

EXAMPLE 5

*Synthesis of a mono alkyl ester of malic acid*

A 500 milliliter, three-neck reaction flask was adapted with a mechanical stirrer, reflux condenser and centigrade thermometer. The flask was charged with 50 mls. of 1–4 dioxane and 1 ml. of concentrated hydrochloric acid. This mixture was warmed to 60° C. and 134.1 gms. (1.0 mole) of malic acid, molecular weight 134.1, was introduced over a 15 minute period with constant stirring. Then, 131.75 gms. (0.5 mole) of a stearyl-cetyl alcohol mixture, molecular weight 263.5, as described in Example 3 above was added to the reaction flask over a period of 15 minutes with increasing temperature. The contents of the flask was then refluxed for 2 hours at approximately 95° C. Following reflux, the reaction mixture was removed to a beaker and the product was allowed to solidify over the dioxane solvent. The cake was removed from the beaker, warmed to melt and transferred to a separatory funnel. At melt, the reaction product was washed twice with 85° C. saturated salt water. After the second wash, an emulsion was formed which was dissolved in ether in a warm water bath. Finally, the ether was evaporated and the compound was allowed to solidify. The resultant cake was dried by melting in a vacuum dessicator equipped with infrared heat. The resultant product was a white, hard, waxy solid having the following chemical and physical properties:

Saponification number: Theoretical, 296; actual, 235.6.
Melting point: 48°–49° C.
It corresponded to the formula:

$$R^1OOCCHOHCH_2COOH$$

wherein $R^1$ corresponds to the alkyl substituents of the commercial fatty alcohol employed.

EXAMPLE 6

*Preparation of the sodium salt of a monocetyl ester of glutaric acid*

One hundred grams of the monocetyl glutaric acid of Example 2, molecular weight 356.56, were melted in a tall form, 500 ml. beaker in a hot water bath. 14.5 gms. of sodium carbonate, molecular weight 105.99, were added slowly with constant stirring. The neutralization reaction, as indicated by foaming, continued for approximately 20 minutes. The material was then dried under vacuum in a dessicator using infrared heat. Several hours were required to remove the water of neutralization. In drying, the temperature of the material reached 225° C. The final product, when cooled, was hard and brittle with a light tan color, and dispersible in water. The material was easily pulverized using a mortar and pestle. It had the following chemical and physical characteristics:

Acid number: Theoretical, 0; actual, 0.5.
Saponification number: Theoretical, 148.2; actual, 150.15.
Melting point: 150° C.

The product corresponded to the formula:

$$C_{16}H_{33}OOCCH_2CH_2CH_2COONa$$

EXAMPLE 7

*Preparation of a mono alkyl ester of azelaic acid*

A one liter, three-neck reaction flask was equipped with a mechanical stirrer, graduated dropping funnel, thermometer and water condenser. 226 gms. (1.2 moles) of azelaic acid (average molecular weight 190.2, melting point range 96°–101° C., 85 percent pure containing 9 percent dibasic acids less than 9 carbons and 6 percent greater than 9 carbons) was introduced and the acid was brought to a temperature of 150° C. by means of a heating mantle controlled by a variable rheostat. One milliliter of concentrated hydrochloric acid was pipetted into the flask and then 263.5 gms. (1 mole) of a stearyl cetyl alcohol composition (approximate composition 1% $C_{12}$, 4% $C_{14}$, 32% $C_{16}$, 62% $C_{18}$, and 1% $C_{20}$) was added drop-wise at melt over a period of 3 hours. During this time interval, approximately one-half of the theoretical water of esterification was collected. Heating at 150° C. with continuous stirring was continued for an additional 5 hours and 15 minutes at which time the total theoretical water of esterification was recovered. The product was then washed at 85° C. with 500 milliliters of distilled water and then dried, employing about 10 mm. mercury vacuum and heat from an infrared lamp.

The resultant product was a buff colored, hard, waxy solid at room temperature, having the following physical and chemical properties:

Acid number: Theoretical, 128.8; actual, 114.8.
Saponification number: Theoretical, 257.6; actual, 245.4.
Melting point range: 49.5°–51.0° C.
It corresponded to the formula:

$$R^1OOC-(CH_2)_7-COOH$$

wherein $R^1$ corresponds to the alkyl substituents of the commercial fatty alcohol employed.

EXAMPLE 8

*Preparation of a mono alkyl ester of sebacic acid*

The apparatus and procedure described in Example 7 was employed with slight modification for the preparation of the mono fatty alcohol derivative of sebacic acid. The reaction flask was charged with 242.6 gms. (1.2 moles) of CP grade sebacic acid. On warming to 200° C., 263.5 gms. (1.0 mole) of stearyl-cetyl alcohol composition as described in Example 3 was added over a period of 55 minutes. Hydrochloric acid was not employed as a catalyst in this reaction. Heating with continuous stirring at 200° C. was continued for 30 minutes after the alcohol addition was complete. Following this time period, the theoretical water of esterification was recovered.

The resultant product was washed twice with one liter of distilled water and vacuum dried with the aid of an infrared heating lamp. The final product was a light cream colored, hard, brittle solid at room temperature, having the following physical and chemical properties:

Acid number: Theoretical, 125.3; actual, 119.0.
Saponification number: Theoretical, 250.6; actual, 237.0.

Melting point range: 66°–68° C.

It corresponded to the formula:

$$R^1OOC(CH_2)_8COOH$$

wherein $R^1$ corresponds to the alkyl substituents of the commercial fatty alcohol employed.

EXAMPLE 9

*Preparation of a mono oleyl ester of fumaric acid*

A reaction flask was charged with 107.8 gms. (1.1 moles) of maleic anhydride and warmed to 125° C. with stirring. Then 268.0 gms. (1.0 mole) of oleyl alcohol (approximate composition: unsaturated: $C_{18}$, 85%; $C_{16}$, 4%; $C_{18}$[linoleyl], 6%; saturated: $C_{14}$, 1%; $C_{16}$, 2%; $C_{18}$, 1%; $C_{20}$ 2%) was introducted slowly into the reaction flask during a period of 30 minutes. The reaction mixture was stirred constantly and dry hydrogen chloride gas was bubbled through the reactants to insure complete conversion of the maleic (cis) to the fumaric (trans) ester. Following the addition of the alcohol, the temperature of the reactants was maintained at 125° C. with stirring and in the presence of dry hydrogen chloride for a period of 60 minutes. The resultant product was washed at 50° C. with four aliquots of salt water and finally dried under vacuum.

The resultant product was a dark cream colored, soft, plastic solid at room temperature, having the following chemical and physical characteristics:

Acid number: Theoretical, 153.3; actual, 148.7.

Saponification number: Theoretical, 306.3; actual, 291.7.

Melting point range: 41°–43° C.

It corresponded to the formula:

$$C_{18}H_{35}OOCCHCHCOOH \text{ (trans)}$$

EXAMPLE 10

*Preparation of mono oleyl ester of succinic acid*

A 500 mililiter, three-neck reaction flask was fitted with mechanical stirrer, centigrade thermometer and pressure relief valve and charged with 110.1 gms. (1.1 moles) of succinic anhydride, molecular weight 100.1. The succinic anhydride was melted in the flask and the temperature was raised to 130° C. Then, 267.5 gms. (1.0 mole) of oleyl alcohol, molecular weight 267.5, 77 percent unsaturated, was warmed and added to the melted succinic anhydride with gradually increasing temperature. Following the addition of the oleyl alcohol, the temperature was increased to 150° C. and the reaction was continued for one hour.

The resultant product was washed twice with 85° C. salt water and dried in a vacuum oven at 60° to 70° C. The product was a clear amber liquid at room temperature with the following chemical and physical characteristics:

Acid number: Theoretical, 152.6; actual, 154.3.

Saponification number: Theoretical, 305.2; actual, 294.5.

Melting point range: 19–20° C.

It corresponded substantially to the formula:

$$C_{18}H_{35}OOCCH_2CH_2COOH$$

It will be understood by those skilled in the art that the formulae given in Examples 1 to 10 represent only the major mono-ester component of the reaction product. For instance, in Examples 9 and 10, the mono-esters with alkyl substituents other than oleyl ($C_{18}H_{35}$—) are present because of the nature of the alcohol used as a starting material.

It will further be clear from Examples 1 to 10 that in making the mono-esters, the dicarboxylic acid compound is employed in stoichiometric amount, and usually in excess of stoichiometric amount, based on the alcohol.

The mono-esters disclosed are surface active, i.e. they are capable of modifying the surface tension at an oil-water interface. As such, alone or in combination, they find advantageous use in many industries where the modification of surface tension at an oil-water interface is desired. With the exception of the mono-esters of maleic acid (cis), the mono-esters described are substantially non-toxic, and are therefore especially useful for modifying surface tension at an oil-water interface in food products.

Hydrated forms of the mono-esters are particularly suitable for addition to food preparations. The hydrated forms may be prepared by the addition of water to the acid or salt form of the mono-esters.

The improved physical and baking characteristics of yeast leavened baked goods containing the improvers described herein will now be described with particular reference to bread.

In testing the compounds described as bread improvers, the characteristics which the baker requires have been related to laboratory tests.

The effect of a compound on production tolerance was first tested on the farinograph. In farinograph studies, the production tolerance potential of a flour-water dough is measured by actually mixing a dough in a mixer which records the characteristic viscosity of the dough as it is mixed. If these characteristics are altered by the presence of the test compound, a change in production characteristics can be predicted. An increase in tolerance to mixing, a more rapid hydration, and a greater elasticity are evidence that the compound is an effective bread improver.

Following farinograph studies, the compounds were tried in a laboratory test bake, "Conv. Test," to determine their performance in a complete dough under conditions which parallel those in a bakery. The criteria of effectiveness for a bread improver are an increase in volume over the control bread, an increase in the total quality score, and an increase in compressibility (softness). These are the criteria most used by the baker to evaluate his bread.

After laboratory test bakes, the compounds were tested in a commercial bakery. For commercial testing there were selected probably the most difficult conditions in modern bread production, namely, balloon bread made on continuous mix, "Com. Cont." The entire process was carefully checked to determine what, if any, changes occurred. The goals in the commercial test were greater production tolerance and an improved product along the lines discussed earlier. The same evaluation criteria as were applied in the laboratory bake were employed here also.

Actual bake tests under commercial conditions are considered essential if improving agents of the type described herein are to be properly evaluated for efficiency when modern breadmaking machinery and procedures are employed.

The compounds specifically tested were the following:

| Abbreviation: | Compound |
|---|---|
| S.F.A. | Mono Stearyl Fumaric Acid. |
| S.S.A | Mono Stearyl Succinic Acid. |
| S.A.A. | Mono Stearyl Adipic Acid. |
| S.G.A. | Mono Stearyl Glutaric Acid. |
| S. Seb. A. | Mono Stearyl Sebacic Acid. |
| O.F.A. | Mono Oleyl Fumaric Acid. |
| O.S.A. | Mono Oleyl Succinic Acid. |

The listed compounds were prepared following the procedures of the examples, supra. In making the stearyl derivatives, a fatty alcohol mixture corresponding to that described in Example 3 was used, while in preparing the oleyl derivatives, the oleyl alcohol composition described in Example 9 was employed.

The actual procedures employed in carrying out the tests will now be described.

EVALUATION OF THE EFFECT OF COMPOUNDS ON FARINOGRAPH

*General method.*—American Association of Cereal Chemists, Physical Dough Testing Method 54–21, Constant Flour Weight Procedure (large bowl) as published in Cereal Laboratory Methods, 7th edition, AACC (1962).

*Method adaptation used to evaluate compounds.*—The flour is weighed (300 gms.) "as is" with no compensation for the moisture content since a control farinogram of the standard flour is obtained each time a compound is tested.

The compound is neutralized to the sodium salt in accordance to its acid number and added to the flour as a viscous aqueous liquid before the farinograph is started.

Water is added according to the standard method until a farinogram centered on the 500 Brabender Units (B.U.) line is obtained. This quantity of water is added to the quantity of water introduced with the compound to give the total amount of water used in calculating the absorption.

The farinograph is run for a minimum of 20 minutes or until 5 minutes after the departure time.

ANALYSIS OF FARINOGRAM—DEFINITIONS

*Absorptions.*—Total amount of water (ml.) used to obtain a curve centered at 500 B.U. consistency divided by the total weight of the flour (300 grams) and this multiplied by 100. This is a baker's measure of the amount of water, based on the flour weight, which is necessary to obtain a uniform dough consistency. This parameter may be affected by various chemical entities. An increase is especially beneficial from a baker's point of view.

*Arrival or arrival time.*—The time in minutes required for the top of the farinogram curve to intersect the 500 B.U. consistency line. This reflects the hydration stage of dough mixing. Rapid hydration is beneficial to bakers in that it will permit greater latitude in production conditions.

*Peak or peak time.*—The time in minutes required to reach maximum consistency; this is read at the highest point on the curve. This measurement reflects the time necessary to fully develop the gluten in the dough. This time should not be abnormally long.

*Departure or departure time.*—The time in minutes required for the top of the farinogram curve to cut the 500 B.U. consistency line after the peak has been reached. This point indicates the breakdown of the dough under continued mixing.

*Tolerance or stability.*—The difference in minutes between the arrival and the departure. This is a measurement of the latitude which the baker can expect from the dough ingredients being tested. An increase in stability is very advantageous since it will permit the baker to adjust or change his dough production conditions without affecting the quality of his product.

*Mixing tolerance index, or M.T.I.*—The difference in B.U. from the top of the curve at the peak to the top of the curve 5 minutes after the peak. This figure should not be excessively high.

*Consistency or consistency at the peak.*—The width of the farinogram curve in B.U. at the peak. This measurement reflects the strength of the flour at optimum development. It should be neither too high indicating a tough dough or too small indicating a slack dough. It should center between 70 and 80 B.U.

EVALUATION OF THE EFFECT OF COMPOUNDS IN CONVENTIONAL BAKING TEST

The white bread formula and baking procedure used in preparing loaves of bread by a conventional sponge and dough method will now be described.

The ingredients utilized are enumerated below with their corresponding percent levels. The percentage values both here and in the continuous mix procedure, infra, are based on the total flour weight contained in the formula as 100%. Percentage reported in this manner is usually termed "baker's percentage" and implies parts by weight in reference to the total flour as 100 parts.

FORMULA—BASED UPON 800 GMS. OF FLOUR

| Ingredients | Percent | Weight (gms.) |
|---|---|---|
| Flour (14% M.B.) | 100.00 | 800 |
| Salt | 2.25 | 18 |
| Sucrose | 4.00 | 32 |
| Corn Sugar | 5.00 | 40 |
| Lard | 3.00 | 24 |
| Nonfat Dry Milk | 3.50 | 28 |
| Yeast | 3.00 | 24 |
| Arkady Yeast Food | 0.50 | 4 |
| Water (variable) | 60–67 | 480–536 |

The sponge consists of 65% of the total bread flour, 0.50% Arkady yeast food, 3% yeast, and 41.60% water based on the sponge flour weight. The yeast is emulsified in a portion of the sponge water prior to the addition to the flour. These ingredients are mixed in a water-jacketed Hobart mixer, Model A–120. By adjustment of the cold water supply to the insulated jacket surrounding the mixing bowl, a sponge temperature of 80° F. is maintained. The components of the sponge are mixed one-half minute at low speed (48 r.p.m.) and then four minutes at second speed (88 r.p.m.). The resultant sponge is then transferred to a tinned metal trough and fermented 4¼ hours in a National Manufacturing Company fermentation cabinet; constant temperature and humidity are maintained, as measured by a hygrometer, 91% relative humidity with a dry bulb temperature of 80° F.

The sponge is subsequently remixed with the remaining portion of the formula. The dough ingredients consist of 35% of the total flour, 3.50% milk, 2.25% salt, 5.0% corn sugar, 4.0% granulated sucrose, 3.0% lard, and the remaining water. The dough is mixed at low speed (48 r.p.m.) for one-half minute, and usually about 5 minutes at second speed (88 r.p.m.) in a Hobart A–120 mixer. The mixing time is dependent upon the physical characteristics of the particular flour employed. The dough temperature is regulated by adjusting the mixing bowl jacket temperature and the dough water temperature so that the dough comes from the mixer at 80° F.

The dough is then placed in the fermentation cabinet mentioned above for 40 minutes. Following this fermentation period or floor time, two 542 gram dough pieces are scaled. The scaled dough pieces are passed through a dough sheeter initially with a roll clearance of 5/16 inch and then a second time at 7/32 inch. The pieces are then given a 10 minute recovery time on the bench at room temperature covered with polyethylene to minimize moisture loss. This part of the procedure corresponds to an overhead proofer in a commercial bake shop.

Following the 10 minute recovery period, the doughs are again sheeted through rolls set at a distance of 5/16 inch and then molded through a Thomson drum-type molder which has been converted to the commercial straightaway molder design normally found in a commercial shop. The molded dough pieces are panned, numbered and placed in a Humi-Temp proof box and allowed to rise at 110° F. dry bulb and 105° F. wet bulb until the top surface of the center of the dough is ¾ inch above the top of the pan. The entire proofing process averages slightly less than 1 hour.

The bread pans utilized have a pan factor of 2.48 sq. in. top pan surface per ounce of dough. Their dimensions are as follows:

Top: 4½ in. x 10 in.
Bottom: 3⅞ in x 9½ in.
Depth: 3¼ in.

When the dough has risen to the desired volume, it is baked for 21 minutes in a four-tray Reed Reel oven at a temperature of 425° F. From the oven, the bread is placed on a wire cooling rack for 70 minutes. The loaves are then packaged in air-tight polyethylene bags; uniform cooling is accomplished by spacing the test loaves approximately 2 inches apart on the bench until evaluation is to be made. Room temperature is not carefully controlled, which allows for difference in compressibility from day to day. However, control loaves are baked daily and used as a point of reference.

Following a storage period of usually 18 hours, bread quality is scored according to a modified method used by The American Institute of Baking which is a numerical summary of the internal and external quality factors which have been carefully weighed as to their relative importance. The relative importance of these factors are presented in the table below.

External:
    Volume _____ 10
    Crust color _____ 3
    Symmetry _____ 3
    Evenness of bake _____ 3
    Crust character _____ 3
    Break and shred _____ 3
                                           —
                                           25

Internal:
    Grain _____ 19
    Crumb color _____ 12
    Aroma _____ 10
    Taste _____ 10
    Chewability _____ 12
    Texture _____ 12
                                           —
                                           75

Total external and internal _____ 100

Crumb compressibility is usually measured after storage of the loaves in the air-tight polyethylene containers at room temperature for 18 and 42 hours. The loaves of bread are placed in a miter box and three 2 inch slices are cut from the center of each loaf. A Precision Penetrometer fitted with a disc-shaped plunger 3 cm. in diameter and weighing 265 gms. is employed to measure compressibility. The 3 cm. disc is placed in the center of each slice and allowed to compress the bread crumb for a period of ten seconds at which time its movement is arrested and the depth of penetration measured by means of a dial micrometer calibrated in 0.1 millimeter. An average of six compression values is generally considered a valid measure of crumb compressibility.

Staling or firming is measured as the decrease in compressibility from 18 to 42 hours.

EVALUATION OF THE EFFECT OF COMPOUNDS IN CONTINUOUS MIX BAKING TEST

The white bread formula and baking procedure used in preparing continuous mix loaves of bread are described below:

FORMULA—BASED ON 14 POUNDS OF FLOUR (6,350 grams)

|  | Percent | Grams |
|---|---|---|
| a. Brew: |  |  |
| Flour | 10.00 | 635.0 |
| Cerelose | 3.00 | 190.5 |
| Salt | 2.25 | 142.8 |
| C M Yeast Food | 0.75 | 47.6 |
| Yeast | 3.00 | 190.5 |
| Water (Variable) | 67.00 | 4,254.5 |
| b. Spike: |  |  |
| Nonfat Dry Milk | 1.00 | 63.5 |
| Sucrose | 6.00 | 381.0 |
| c. Premix Ingredients: |  |  |
| Flour | 90.00 | 5,715.0 |
| Shortening |  | 190.5 |

Prime Steam Lard Adjusted to softening point of 110° F.±2° F. with lard or cottonseed flakes:

Oxidation Ratio _____ Bromate-Iodate __ 7-1
Oxidation Amount _____ p.p.m __ 75

Oxidation Solution:
    Bromate _____ gms __ 0.0429
    Iodate _____ gms __ 0.0048
    Water _____ gms __ 7.5
Total _____ 26 lbs __ 11,810.9

The brew is fermented in 2½ gallon polyethylene buckets in a water bath maintained at 87° F. The brews are set at a temperature of 84° F. and are under constant agitation during the fermentation period. At transfer time, the brews attain a temperature of 88–89° F. The temperature of the premixed dough is controlled at 86 to 87° F. The bromate-iodate mixtures are prepared in water solution. The amount required for the test is volumetrically added to the brew one minute before transfer.

Incorporation of the above premix ingredients with the brew is accomplished with a Century 40-quart, floor model, mixer by mixing exactly one minute at low speed and fifteen seconds at high speed. This schedule is adhered to closely. The shortening at 140° F. is added during the low speed operation of the mixer.

The dough is then transferred to the premix chamber of the laboratory continuous mix machine and hydraulically forced through the developer at the optimum developer speed previously determined (120 to 135 r.p.m.). Dough temperature from the developer is maintained at 102° F. by hot and cold water circulated through a water jacket around the developer and controlled with an electric thermistor-type unit operating two solenoid water valves.

The dough is extruded at a constant rate of from 3.0 to 3.4 pounds per minute (depending on dough consistency) into open-end pans moving at constant speed on a conveyor belt. The dough is accurately scaled at 511 grams and the end of the pans properly inserted for proofing and baking. The pan factor is 2.6 square inches of pan top area per ounce of dough scales. The pan dimensions are:

Top: 10 in. x 4½ in.
Bottom: 10 in. x 3⅜ in.
Depth: 3 in.

During each dough batch, the machine is operated at three developer speeds. The doughs are proofed 55 minutes at 110° F. dry bulb and 105° F. wet bulb. Following proof, the height of the dough above the top of the pan is measured. A baking period of 18 minutes at 460° F. is employed.

The bread from the oven is cooled approximately 80 minutes and then placed in polyethylene bags for scoring the following day. Loaf volumes are measured by the rape seed displacement method. Scoring is accomplished by three individuals without collaboration of their observations.

Following a storage period of 18 hours, bread quality is scored according to a modified method used by the American Institute of Baking, described supra. Crumb compressibility is also measured following the procedure outlined above.

COMPOUND PREPARATION FOR INTRODUCTION INTO TESTS

General

Salt form: Compound neutralized with sodium hydroxide in accordance with its acid number. This forms the sodium salt.

Acid form: Compound used in its natural state.

Test bake

Salt form: Compound neutralized in accordance with its acid number to give the hydrated sodium salt. This is introduced at the dough makeup stage of a sponge-dough conventional test bake. In continuous mix, it is introduced at the dough stage as part of the fat.

Acid form: Compound melted and dissolved or dispersed in the fat and introduced at the dough makeup stage of the conventional test bake. In continuous mix, the compound is also dispersed in the fat and enters the dough with the fat at the dough stage.

Breddo-CM: A commercially available bread improver consisting of a hydrated mono-glyceride mixture. This is introduced at the dough stage of continuous mix dispersed in the melted fat.

Farinograph: Compound tested as the hydrated sodium salt, neutralized in accordance with its acid number. (See Farinograph procedure).

FUNCTIONALITY DATA OBTAINED

Using the foregoing testing procedures, the specific compounds listed supra were evaluated for functionality as bread improvers.

The test results are tabulated in Tables 1–3.

TABLE I.—MONO LIPID ESTERS OF DICARBOXYLIC ACIDS
[Farinograph.—Data Table]

| Compound (Abbreviation) | S.F.A. | | S.S.A. | | S.A.A. | | S.G.A. | | S.Seb.A. | | O.F.A. | | O.S.A. | |
|---|---|---|---|---|---|---|---|---|---|---|---|---|---|---|
| Compound Code | Control | 1001-6 | Control | 1157-5 | Control | 1000-2 | Control | 1243-5 | Control | 1290 | Control | 1295 | Control | 1294 |
| Form | | Salt | | Salt | | Salt | | Salt | | Salt | | Salt | | Salt |
| Compound Level | | 0.5% | | 0.5% | | 0.5% | | 0.5% | | 1.5% | | 0.5% | | 0.5% |
| Absorption (percent) | 64.5 | 63.9 | 63.3 | 63.3 | 62.2 | 61.3 | 62.2 | 64.1 | 64.1 | 64.0 | 64.1 | 63.5 | 64.1 | 63.5 |
| Arrival (min.) | 2.7 | 1.3 | 2.7 | 3.2 | 2.6 | 1.0 | 2.6 | 0.8 | 3.0 | 4.6 | 3.0 | 6.8 | 3.0 | 5.2 |
| Peak (min.) | 7.1 | 9.0 | 7.0 | 11.5 | 6.0 | 10.0 | 6.0 | 10.0 | 6.5 | 9.5 | 5.6 | 20.0 | 5.6 | 15.7 |
| Departure (min.) | 10.6 | 17.0 | 10.5 | 20.2 | 9.6 | 16.0 | 9.5 | 18.0 | 9.8 | 14.0 | 9.8 | 31.6 | 9.8 | 25.3 |
| Stability (min.) | 7.9 | 15.7 | 7.8 | 17.0 | 6.9 | 15.0 | 6.9 | 17.2 | 6.8 | 9.4 | 6.8 | 24.8 | 6.8 | 20.1 |
| M. T. I. (B.U.) | 50 | 15 | 55 | 20 | 45 | 25 | 45 | 20 | 25 | 40 | 25 | 10 | 25 | 5 |
| Peak Consistency (B.U.) | 70 | 70 | 80 | 75 | 80 | | 80 | 80 | 70 | 70 | 70 | 70 | 70 | 70 |
| Percent Farinograph—Improvement: | | | | | | | | | | | | | | |
| Absorption | | −0.9 | | 0 | | −1.4 | | +3.0 | | −0.2 | | −0.9 | | −0.9 |
| Arrival | | +51.8 | | −18.5 | | +61.5 | | +69.2 | | −53.3 | | −126.7 | | −73.3 |
| Peak | | +26.8 | | −64.3 | | +66.7 | | +66.7 | | +69.6 | | +257.1 | | +180.4 |
| Departure | | +60.4 | | +92.4 | | +68.4 | | +89.5 | | +42.0 | | +222.4 | | +158.2 |
| Stability | | +98.7 | | +117.9 | | +117.4 | | +149.3 | | +38.2 | | +264.7 | | +195.6 |
| M. T. I. | | +70.0 | | +63.6 | | +44.4 | | +55.6 | | −60.0 | | +60.0 | | +80.0 |
| Peak Consistency | | 0 | | +6.2 | | +12.5 | | 0 | | 0 | | 0 | | 0 |

Calculation of Percent Improvement:
100×(Cpd.−Cont.)/Control.
100×(Cont.−Cpd.)/Control.
100×(Cpd.−Cont.)/Control.
100×(Cpd.−Cont.)/Control.
100×(Cpd.−Cont.)/Control.
100×(Cont.−Cpd.)/Control.
100×(Cont.−Cpd.)/Control.

Abbreviations: S.F.A.—Mono Stearyl Fumaric Acid; S.S.A.—Mono Stearyl succinic Acid; S.A.A.—Mono Stearyl Adipic Acid; S.G.A.—Mono Stearyl Glutaric Acid; S.Seb.A.—Mono Stearyl Sebacic Acid; O.F.A.—Mono Oleyl Fumaric Acid; O.S.A.—Mono Oleyl Succinic Acid; Com. Cont.—Commercial Continuous Mix Field Test; Conv. Test—Conventional Test Bake.

TABLE II.—MONO LIPID ESTERS OF DICARBOXYLIC ACIDS
[Table.—Numerical improvement]

| Compound (Abbreviation) | S.F.A. | | S.F.A. | | S.S.A. | | | S.S.A. | | S.A.A. | | S.A.A. | | |
|---|---|---|---|---|---|---|---|---|---|---|---|---|---|---|
| Bake Type | Con. Cont. | | Conv. Test | | Conv. Test | | | Conv. Test | | Conv. Test | | Conv. Test | | |
| Compound Code | Control | 1001-5 | Control | 1001-6 | Control | 1157 | 1157 | Control | 1157-9 | Control | 1000-9 | Control | 1000-6 | 1000-6 |
| Form | | acid | | Salt | | Acid | Acid | | Salt | | Acid | | Salt | Salt |
| Level | | 0.2% | | 0.25% | | 0.25% | 0.5% | | 0.25% | | 0.25% | | 0.25% | 0.5% |
| Volume, cu. in | [1] 6.21 | [1] 6.68 | 173 | 171 | 161 | 164 | 162 | 173 | 171 | 169 | 169 | 165 | 170 | 169 |
| Quality Score | 90.4 | 91.5 | 92.2 | 92.1 | 91.6 | 92.7 | 93.0 | 92.2 | 92.4 | 94.9 | 95.1 | 92.7 | 94.3 | 94.1 |
| Compressibility (0.1 mm.): | | | | | | | | | | | | | | |
| 18 hrs | | | 179 | 213 | 170 | 196 | 191 | 179 | 212 | 204 | 226 | 187 | 184 | 207 |
| 24 hrs | 260 | 309 | | | | | | | | | | | | |
| 44 hrs | | | 137 | 154 | 103 | 146 | 154 | 137 | 168 | 160 | 169 | 139 | 165 | 184 |
| 72 hrs | 198 | 236 | | | | | | | | | | | | |
| 144 hrs | 154 | 191 | | | | | | | | | | | | |

| Compound (Abbreviation) | S.G.A. | | S.G.A. | | S.Seb.A. | | | O.F.A. | | | O.S.A. | | |
|---|---|---|---|---|---|---|---|---|---|---|---|---|---|
| Bake Type | Com. Cont. | | Conv. Test | | Conv. Test | | | Conv. Test | | | Conv. Test | | |
| Compound Code | Control | 1243-5 | Control | 1150-5 | Control | 1290 | 1290 | Control | 1295 | 1295 | Control | 1294 | 1294 |
| Form | Breddo CM | Acid | | Salt | | Acid | Acid | | Acid | Acid | | Acid | Acid |
| Level | 0.5% | 0.15% | | 0.25% | | 0.25% | 0.5% | | 0.25% | 0.5% | | 0.25% | 0.5% |
| Volume, cu. in | 102 | 189 | 170 | 172 | 165 | 167 | 167 | 181 | 175 | 168 | 181 | 179 | 174 |
| Quality Score | 90.2 | 91.2 | 92.2 | 93.8 | 92.4 | 93.1 | 93.0 | 93.3 | 92.6 | 89.9 | 93.3 | 93.7 | 92.4 |
| Compressibility (0.1 mm.): | | | | | | | | | | | | | |
| 18 hrs | | | 212 | 257 | 225 | 199 | 211 | 189 | 215 | 217 | 189 | 198 | 218 |
| 24 hrs | 260 | 298 | 126 | 182 | | | | | | | | | |
| 44 hrs | | | | | 181 | 172 | 166 | 154 | 153 | 176 | 154 | 154 | 182 |
| 72 hrs | 162 | 185 | | | | | | | | | | | |
| 144 hrs | | | | | | | | | | | | | |

[1] Cc./g.

TABLE III.—MONO LIPID ESTERS OF DICARBOXYLIC ACIDS

[Table.—Percent improvement]

| Compound (Abbreviation) | S.F.A. | S.F.A. | S.S.A. | S.S.A. | S.A.A. | S.A.A. | S.G.A. | S.G.A. | S.Seb.A. | | O.F.A. | | O.S.A. | |
|---|---|---|---|---|---|---|---|---|---|---|---|---|---|---|
| Bake Type | Com. Cont. | Conv. Test | Conv. Test | Conv. Test | Conv. Test | Conv. Test | Com. Cont. | Conv. Test | Conv. Test | | Conv. Test | | Conv. Test | |
| Compound Code | 1001-5 | 1001-6 | 1157 | 1157-9 | 1000-9 | 1000-6 | 1243-5 | 1150-5 | 1290 | | 1295 | | 1294 | |
| Form | Acid | Salt | Acid | Acid | Salt | Acid | Salt | Salt | Acid | Salt | Acid | Acid | Acid | Acid | Acid | Acid |
| Level | 0.2% | 0.25% | 0.25% | 0.5% | 0.25% | 0.25% | 0.25% | 0.5% | 0.15% | 0.25% | 0.25% | 0.5% | 0.25% | 0.5% | 0.25% | 0.5% |
| Volume | +7.6 | −1.2 | +1.8 | +0.6 | −1.2 | 0 | +3.0 | +2.4 | +3.5 | +1.2 | +1.2 | +1.2 | −3.3 | −7.2 | −1.1 | −3.9 |
| Quality Score | +1.2 | −0.1 | +1.2 | +1.5 | +0.2 | +0.3 | +1.7 | +1.5 | +1.1 | +1.7 | +0.8 | +0.6 | −0.8 | −3.6 | +0.4 | −1.0 |
| Compressibility: | | | | | | | | | | | | | | | | |
| 18 hrs | | | +19.0 | +15.3 | +12.4 | +18.4 | +10.8 | −1.8 | +10.7 | | −11.6 | −0.6 | +19.0 | +14.8 | +4.8 | +15.3 |
| 24 hrs | +18.8 | | | | | | | | | +14.6 | +21.2 | | | | | |
| 44 hrs | | +12.4 | +41.7 | +49.5 | +22.6 | +5.6 | +18.7 | +32.4 | | +44.4 | −5.0 | −0.8 | −0.6 | +14.3 | 0 | +18.2 |
| 72 hrs | +19.2 | | | | | | | | +14.2 | | | | | | | |
| 144 hrs | +24.0 | | | | | | | | | | | | | | | |

Table I summarizes the performance of the compounds on the farinograph, while Tables II and III summarize the performance of the compounds in actual baking tests.

In Tables II and III, where actual continuous mix commercial baking data is given, it is reported as "Com. Cont." Conventional laboratory bake test data (sponge and dough) is reported as "Conv. Test."

The data presented in Table III are relative values expressed as percent improvement in load volume, quality score and compressibility over the control. The actual performance data of the compounds in the bake tests is recorded in Table II. The improvement figures in Table III, in other words, are calculated from the actual performance data reported in Table II.

INTERPRETATION AND SIGNIFICANCE OF DATA

*Farinograph.*—The farinograph is an instrument widely used in the flour industry to determine the basic mixing and rheological characteristics of a flour-water dough system. It follows that if a substance modifies the characteristics of a dough, this modification will be reflected in the farinogram.

In the farinograph, flour and water are mixed and the viscosity of the dough during mixing is measured and recorded as a farinogram. The various stages of viscosity have been found to be related to actual bakery performance of the flour.

The *Absorption* describes the amount of water needed to arrive at a given optimum viscosity. This optimum viscosity (consistency) is referred to as 500 Brabender Units (B.U.). All other readings of the farinogram are based on this correct absorption. A change of more than 1% based on the flour is considered significant. An increase rather than a decrease is generally sought.

The *Arrival* is defined as the time at which the farinogram curve first touches the 500 B.U. line. This point reflects the speed with which a flour hydrates and develops viscosity and elasticity. It is sometimes referred to as the hydration time. A rapid hydration or short arrival time is recognized to be beneficial. A change of one minute or more is considered as significant.

The *Peak* is defined as the time when maximum viscosity is attained. A lengthening of the peak time is generally recognized as beneficial. A shift of one or more minutes is significant.

The *Departure* is defined as the time when the viscosity curve registers less than 500 B.U. following the peak. This point is indicative of the breakdown of the dough under the mechanical punishment of mixing. It is generally felt that the longer departure times are beneficial. Significance is accorded to a change of two minutes or more. It should be noted that excessively long departure times (over 20 minutes) may be just as damaging as extremely short ones.

The *Stability* is defined as the difference in time between the departure and arrival time. The stability is a measure of the tolerance of a dough toward mechanical punishment. It measures the time during which the consistency of a dough being mixed remains relatively constant. Changes in a dough which increase stability are beneficial. As in the case of departure time, excessively long stability can be damaging since it will be difficult for a baker to control the machining of his dough to achieve optimum conditions. An increase of three minutes is recognized as significant.

The *M.T.I.* or *Mixing Tolerance Index*, is defined as the decrease in viscosity (B.U.) of a dough 5 minutes after the peak time. A dough which breaks down more slowly will therefore have a lower M.T.I.; this is recognized as beneficial. A change of 10 B.U. or more is considered significant.

The *Peak Consistency* is defined as the width of the farinogram curve at the peak. This is a measure of the resistance which the dough offers to mixing in contrast to its viscosity. An extensible dough would have a lower peak consistency. A change of 10 B.U. is considered significant. To be a positive benefit, the change should reduce the peak consistency.

The *Percent Improvement* data should be evaluated with great care. The farinogram presents a composite of several characteristics and it must be evaluated in this way to yield a meaningful picture. The significance of the percent improvement of individual characteristics should not be stressed under conditions where a composite of characteristics is more meaningful than individual characteristics. As interpreted, it is clear from Table I that the compounds of this invention exert a significant improvement on the characteristics of the dough.

*Test Baking.*—The *Volume* of a loaf of bread is reported in Tables II–III in two different ways. Volume of the conventional test baking bread is reported in cubic inches. A change of two cubic inches or more is considered significant. Volume of the commercial continuous mix test baking bread is reported in cubic centimeters per gram of bread. This is done to eliminate the variability in scaling weights observed in consecutive loaves in a commercial bakery. In this case a change of 0.2 cc./gm. is considered significant. Volume is measured by seed displacement following accepted methods in use generally in the baking industry.

*Quality Score* reflects the overall quality of a loaf of bread. Both internal and external characteristics are evaluated and combined to give the toal quality score. A change of one point or more is considered significant.

*Compressibility*, which is also called crumb softness, is defined as the amount of penetration of a cylindrical plunger weighing 265 gms. into a two inch slice of bread in 10 seconds. It is measured in tenths of a millimeter.

As softness increases, the compressibility will increase and a higher reading will be obtained. A change of twenty tenths of a millimeter or more is considered significant.

*Percent Improvement* recorded in Table III, in all cases, is based on the control. The significance of percent improvement should be evaluated while keeping the numerical change in mind.

From Tables II and III, it is apparent that the agents of this invention, based on actual bake test data, both experimental and commercial, are highly efficacious as bread improving agents.

Additional tests were run to determine the range of maximum effectiveness of the improving agents reported herein.

The standard conventional test baking procedure (sponge and dough) described supra was used. The compounds were introduced at the dough stage as a dispersion of the compound in the fat. The dispersion was made at melt and the fat mixture allowed to solidify before use.

The following compounds were tested at varying rates: Stearyl fumaric acid, Stearyl succinic acid.

The compounds were made using the procedure of the examples, supra, utilizing as the fatty alcohol component of the reaction mixture, the mixture of fatty alcohols described in Example 3.

The results of these tests are recorded in Tables IV and V.

TABLE IV.—STEARYL FUMARIC ACID

| Concentration, percent | | 0.1 | 0.25 | 0.5 | 0.75 | 1.0 |
|---|---|---|---|---|---|---|
| Internal Score | 68.7 | 69.0 | 69.1 | 69.2 | 68.8 | 68.3 |
| External Score | 24.6 | 24.1 | 24.2 | 24.4 | 23.5 | 23.6 |
| Total Score | 93.3 | 93.1 | 93.3 | 93.6 | 92.3 | 91.9 |
| Volume | 176 | 177 | 175 | 176 | 169 | 169 |
| Range | ±8 | +3 −2 | +4 −3 | +4 −2 | ±5 | +3 −4 |
| Compressibility (mm.): | | | | | | |
| 18 hrs | 17.5 | 19.5 | 21.0 | 20.3 | 19.8 | 20.5 |
| 44 hrs | 7.5 | 9.6 | 11.2 | 11.9 | 12.8 | 12.0 |
| Keeping Quality | 10.0 | 10.1 | 9.2 | 11.9 | 14.3 | 11.8 |

TABLE V.—STEARYL SUCCINIC ACID

| Concentration, percent | | 0.1 | 0.25 | 0.5 | 0.75 | 1.0 |
|---|---|---|---|---|---|---|
| Internal Score | 68.7 | 68.3 | 68.7 | 68.9 | 68.7 | 68.8 |
| External Score | 24.6 | 24.2 | 24.5 | 24.6 | 24.1 | 23.5 |
| Total Score | 93.3 | 92.5 | 93.2 | 93.5 | 92.8 | 92.3 |
| Volume | 176 | 174 | 174 | 174 | 171 | 169 |
| Range | ±8 | +6 −3 | +4 −3 | +2 −5 | +1 −2 | +3 −2 |
| Compressibility (mm.): | | | | | | |
| 18 hrs | 17.5 | 18.9 | 20.3 | 20.4 | 19.2 | 19.7 |
| 44 hrs | 7.5 | 9.8 | 9.9 | 12.4 | 12.6 | 13.1 |
| Keeping Quality | 10.0 | 11.0 | 9.6 | 12.5 | 15.2 | 15.2 |

From these results, it is apparent that the range of maximum effectiveness of these compounds is between about 0.1 and 0.5%, based on flour.

The invention in its broader aspects is not limited to the specific compositions, steps and methods described, but departures may be made therefrom within the scope of the accompanying claims without departing from the principles of the invention and without sacrificing its chief advantages.

What is claimed is:

1. A yeast leavened bakery product containing flour having incorporated therein an addition agent comprising an effective amount in the amount of about 0.05 to 2.0 percent by weight based on weight of flour of a non-toxic, mono aliphatic ester of a dicarboxylic acid corresponding to the formula: $R^1OOCRCOOZ$ wherein $R^1$ is a member selected from the group consisting of an aliphatic substituent containing 12 to 24 carbon atoms and mixtures thereof; R is an aliphatic group containing up to and including 8 carbon atoms and Z is a member selected from the group consisting of hydrogen, alkali metal, alkaline earth metal, ammonium and aluminum.

2. The product of claim 1 wherein said mono aliphatic ester is a member selected from the group consisting of succinic, glutaric, adipic, fumaric, malic, azelaic and sebacic acids and mixtures thereof.

3. The product of claim 2 wherein said mono aliphatic ester is the hydrate of said ester.

4. The product of claim 2 wherein said aliphatic substituent contains 16 to 18 carbon atoms and mixtures thereof.

5. A yeast leavened bakery product containing flour having incorporated therein an addition agent comprising an effective amount in the amount of about 0.05 to 2.0 percent by weight based on weight of flour of a mono aliphatic ester of succinic acid corresponding to the formula:

$$R^1OOC(CH_2)_2COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

6. A yeast leavened bakery product containing flour having incorporated therein an addition agent comprising an effective amount in the amount of about 0.05 to 2.0 percent by weight based on weight of flour of a mono aliphatic ester of glutaric acid corresponding to the formula:

$$R^1OOC(CH_2)_3COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

7. A yeast leavened bakery product containing flour having incorporated therein an addition agent comprising an effective amount in the amount of about 0.05 to 2.0 percent by weight based on weight of flour of a mono aliphatic ester of adipic acid corresponding to the formula:

$$R^1OOC(CH_2)_4COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

8. A yeast leavened bakery product containing flour having incorporated therein an addition agent comprising an effective amount in the amount of about 0.05 to 2.0 percent by weight based on weight of flour of a mono aliphatic ester of fumaric acid corresponding to the formula: $R^1OOCCH=CHCOOZ$ (trans.) wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

9. A yeast leavened bakery product containing flour having incorporated therein an addition agent comprising an effective amount in the amount of about 0.05 to 2.0 percent by weight based on weight of flour of a mono aliphatic ester of malic acid corresponding to the formula: $R^1OOCCHOHCH_2COOZ$ wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

10. A yeast leavened bakery product containing flour having incorporated therein an addition agent comprising an effective amount in the amount of about 0.05 to 2.0 percent by weight based on weight of flour of a mono aliphatic ester of azelaic acid corresponding to the formula: $R^1OOC(CH_2)_7COOZ$ wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

11. A yeast leavened bakery product containing flour having incorporated therein an addition agent comprising an effective amount in the amount of about 0.05 to 2.0 percent by weight based on weight of flour of a mono aliphatic ester of sebacic acid corresponding to the formula: $R^1OOC(CH_2)_8COOZ$ wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

12. A yeast leavened bakery product containing flour having incorporated therein an addition agent comprising an effective amount in the amount of about 0.05 to 2.0 percent by weight based on weight of flour of a mono aliphatic ester of a dicarboxylic acid which is a member selected from the group consisting of mono aliphatic ester of succinic, glutaric, adipic, fumaric, malic, azelaic and sebacic acid and mixtures there, wherein said aliphatic group is a member selected from the group consisting of an aliphatic substituent containing 12 to 24 carbon atoms and mixtures thereof; and wherein said mono aliphatic ester is a member selected from the group consisting of the mono aliphatic acid ester, the sodium, potassium, calcium and magnesium salt and mixtures thereof.

13. The product of claim 12 wherein said mono aliphatic ester is a hydrate.

14. A yeast leavened bread product containing flour having incorporated therein an addition agent comprising an effective amount in the amount of about 0.05 to 2.0 percent by weight based on weight of flour of a mono aliphatic ester of succinic acid corresponding to the formula: $R^1OOC(CH_2)_2COOZ$ wherein $R^1$ is a member selected from the group consisting of an aliphatic substituent containing 16 to 18 carbon atoms and mixtures thereof; and Z is a member selected from the group consisting of hydrogen, sodium, potassium, calcium and magnesium; and hydrates thereof.

15. A yeast leavened bread product containing flour having incorporated therein an addition agent comprising an effective amount in the amount of about 0.05 to 2.0 percent by weight based on weight of flour of a mono aliphatic ester of glutaric acid corresponding to the formula: $R^1OOC(CH_2)_3COOZ$ wherein $R^1$ is a member selected from the group consisting of an aliphatic substituent containing 16 to 18 carbon atoms and mixtures thereof; and Z is a member selected from the group consisting of hydrogen, sodium, potassium, calcium and magnesium; and hydrates thereof.

16. A yeast leavened bread product containing flour having incorporated therein an addition agent comprising an effective amount in the amount of about 0.05 to 2.0 percent by weight based on weight of flour of a mono aliphatic ester of fumaric acid corresponding to the formula: $R^1OOCCH=CHCOOZ$ (trans.) wherein $R^1$ is a member selected from the group consisting of an aliphatic substituent containing 16 to 18 carbon atoms and mixtures thereof; and Z is a member selected from the group consisting of hydrogen, sodium, potassium, calcium and magnesium; and hydrates thereof.

17. A yeast leavened bread product containing flour having incorporated therein an addition agent comprising an effective amount in the amount of about 0.05 to 2.0 percent by weight based on weight of flour of a mono aliphatic ester of azelaic acid corresponding to the formula: $R^1OOC(CH_2)_7COOZ$ wherein $R^1$ is a member selected from the group consisting of an aliphatic substituent containing 16 to 18 carbon atoms and mixtures thereof; and Z is a member selected from the group consisting of hydrogen, sodium, potassium, calcium and magnesium; and hydrates thereof.

18. A shortening composition consisting essentially of shortening having incorporated therein an effective amount in an amount of 0.05 to 20 percent by weight based on weight of shortening of a non-toxic, mono aliphatic ester of a dicarboxylic acid corresponding to the formula: $R^1OOCRCOOZ$ wherein $R^1$ is a member selected from the group consisting of an aliphatic substituent containing 12 to 24 carbon atoms and mixtures thereof; R is an aliphatic group containing up to and including 8 carbon atoms; and Z is a member selected from the group consisting of hydrogen, alkali metal, alkaline earth metal, ammonium and aluminum.

19. A shortening composition consisting essentially of shortening having incorporated therein an effective amount in an amount of 0.05 to 20 percent by weight based on weight of shortening of a mono aliphatic ester of a dicarboxylic acid which is a member selected from the group consisting of mono aliphatic ester of succinic, glutaric, adipic, fumaric, malic, azelaic and sebacic acid and mixtures thereof, wherein said aliphatic group is a member selected from the group consisting of an aliphatic substituent containing 12 to 24 carbon atoms and mixtures thereof; wherein said mono aliphatic ester is a member selected from the group consisting of the mono aliphatic acid ester, sodium, potassium, calcium and magnesium salts thereof.

20. The composition of claim 19 wherein said mono aliphatic ester is the hydrate of said ester.

21. A shortening composition consisting essentially of shortening having incorporated therein an effective amount in an amount of 0.05 to 20 percent by weight based on weight of shortening of a mono aliphatic ester of succinic acid corresponding to the formula: $R^1OOC(CH_2)_2COOZ$ wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

22. A shortening composition consisting essentially of shortening having incorporated therein an effective amount in an amount of 0.05 to 20 percent by weight based on weight of shortening of a mono aliphatic ester of glutaric acid corresponding to the formula: $R^1OOC(CH_2)_3COOZ$ wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

23. A shortening composition consisting essentially of shortening having incorporated therein an effective amount in an amount of 0.05 to 20 percent by weight based on weight of shortening of a mono aliphatic ester of adipic acid corresponding to the formula: $R^1OOC(CH_2)_4COOZ$ wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

24. A shortening composition consisting essentially of shortening having incorporated therein an effective amount in an amount of 0.05 to 20 percent by weight based on weight of shortening of a mono aliphatic ester of fumaric acid corresponding to the formula:

$$R^1OOCCH=CHCOOZ \text{ (trans.)}$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

25. A shortening composition consisting essentially of shortening having incorporated therein an effective amount in an amount of 0.05 to 20 percent by weight based on weight of shortening of a mono aliphatic ester of malic acid corresponding to the formula:

$$R^1OOCCHOHCH_2COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

26. A shortening composition consisting essentially of shortening having incorporated therein an effective amount in an amount of 0.05 to 20 percent by weight based on weight of shortening of a mono aliphatic ester of azelaic acid corresponding to the formula:

$$R^1OOC(CH_2)_7COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

27. A shortening composition consisting essentially of shortening having incorporated therein an effective amount in an amount of 0.05 to 20 percent by weight based on weight of shortening of a mono aliphatic ester of sebacic acid corresponding to the formula:

$$R^1OOC(CH_2)_8COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

28. A shortening composition consisting essentially of triglyceride shortening and an effective amount in an amount of 0.05 to 20 percent by weight based on weight of shortening of a mono aliphatic ester of succinic acid corresponding to the formula: $R^1OOC(CH_2)_2COOZ$, wherein $R^1$ is a member selected from the group consisting essentially of an aliphatic substituent containing 16 to 18 carbon atoms and mixtures thereof; and Z is a member selected from the group consisting of hydrogen, sodium, potassium, calcium and magnesium; and hydrates thereof.

29. A shortening composition consisting essentially of triglyceride shortening and an effective amount in an amount of 0.05 to 20 percent by weight based on weight of shortening of a mono aliphatic ester of glutaric acid corresponding to the formula: $R^1OOC(CH_2)_3COOZ$, wherein $R^1$ is a member selected from the group consisting essentially of an aliphatic substituent containing 16 to 18 carbon atoms and mixtures thereof; and Z is a member selected from the group consisting of hydrogen, sodium, potassium, calcium and magnesium; and hydrates thereof.

30. A shortening composition consisting essentially of triglyceride shortening and an effective amount in an amount of 0.05 to 20 percent by weight based on weight of shortening of a mono aliphatic ester of fumaric acid corresponding to the formula: $R^1OOCCH=CHCOOZ$ (trans.), wherein $R^1$ is a number selected from the group consisting essentially of an aliphatic substituent containing 16 to 18 carbon atoms and mixtures thereof; and Z is a member selected from the group consisting of hydrogen, sodium, potassium, calcium and magnesium; and hydrates thereof.

31. A shortening composition consisting essentially of triglyceride shortening and an effective amount in an amount of 0.05 to 20 percent by weight based on weight of shortening of a mono aliphatic ester of azelaic acid corresponding to the formula: $R^1OOC(CH_2)_7COOZ$, wherein $R^1$ is a member selected from the group consisting essentially of an aliphatic substituent containing 16 to 18 carbon atoms and mixtures thereof; and Z is a member selected from the group consisting of hydrogen, sodium, potassium, calcium and magnesium; and hydrates thereof.

32. A method of improving the quality characteristics of yeast leavened bakery products containing flour which comprises adding to said products, before baking, an effective amount in an amount of about 0.05 to 2.0 percent by weight based on weight of flour of a non-toxic, quality improving agent which comprises the mono aliphatic ester of a dicarboxylic acid corresponding to the formula: $R^1OOCRCOOZ$, wherein $R^1$ is a member selected from the group consisting of an aliphatic substituent containing 12 to 24 carbon atoms and mixtures thereof; R is an aliphatic group containing up to and including 8 carbon atoms; and Z is a member selected from the group consisting of hydrogen, alkali metal, alkaline earth metal, ammonium and aluminum.

33. The process of claim 32 wherein said mono aliphatic ester is a member selected from the group consisting of succinic, glutaric, adipic, fumaric, malic, azelaic and sebacic esters, and mixtures thereof.

34. The process of claim 32 wherein said mono aliphatic ester is selected from the group consisting of the mono cetyl and mono stearyl esters of succinic, glutaric, fumaric and adipic acid, and mixtures thereof, and the sodium, potassium, magnesium and calcium salts, and mixtures thereof.

35. The process of claim 33 wherein said mono aliphatic ester is the hydrate of the ester.

36. A method of improving the quality characteristics of yeast leavened bread containing flour which comprises adding to said bread, before baking, an effective amount in an amount of about 0.05 to 2.0 percent by weight based on weight of flour of a quality improving agent which agent comprises a mono aliphatic ester of a dicarboxylic acid which is a member selected from the group consisting of the succinic, glutaric, adipic and fumaric acid and mixtures thereof wherein said aliphatic substituent contains 16 to 18 carbon atoms and mixtures thereof, and said ester is selected from the group consisting of the aliphatic mono acid ester, the sodium, potassium, calcium and magnesium salts thereof.

37. A yeast leavened bread product containing flour and having incorporated therein an addition agent comprising an effective amount in the amount of 0.05 to 2.0 percent by weight based on weight of flour of a mono aliphatic ester of a dicarboxylic acid which is a member selected from the group consisting of mono aliphatic ester fumaric, succinic, glutaric, and adipic acids, and mixtures thereof, wherein said aliphatic substituent is a member selected from the group consisting of stearyl and cetyl, and mixtures thereof; wherein said mono aliphatic ester is a member selected from the group consisting of the mono aliphatic acid ester and the sodium salt, and the hydrate of said ester.

38. A yeast leavened bread product containing flour having incorporated therein an addition agent comprising an effective amount in the amount of about 0.05 to 2.0 percent by weight based on weight of flour of sodium stearyl succinate.

39. A yeast leavened bread product containing flour having incorporated therein an addition agent comprising an effective amount in the amount of about 0.05 to 2.0 percent by weight based on weight of flour of mono stearyl succinic acid ester.

40. A yeast leavened bread product containing flour having incorporated therein an addition agent comprising an effective amount in the amount of about 0.05 to 2.0 percent by weight based on weight of flour of sodium stearyl fumarate.

41. A yeast leavened bread product containing flour having incorporated therein an addition agent comprising an effective amount in the amount of about 0.05 to 2.0 percent by weight based on weight of flour of mono stearyl fumaric acid ester.

42. A yeast leavened bread product containing flour having incorporated therein an addition agent comprising an effective amount in the amount of about 0.05 to 2.0 percent by weight based on weight of flour of sodium stearyl glutarate.

43. A yeast leavened bread product containing flour having incorporated therein an addition agent comprising an effective amount in the amount of about 0.05 to 2.0 percent by weight based on weight of flour of monostearyl glutaric acid ester.

44. A shortening composition consisting essentially of triglyceride shortening and an effective amount in an amount of 0.05 to 20 percent by weight based on weight of shortening of sodium stearyl succinate.

45. A shortening composition consisting essentially of triglyceride shortening and an effective amount in an amount of 0.05 to 20 percent by weight based on weight of shortening of mono stearyl succinic acid ester.

46. A shortening composition consisting essentially of triglyceride shortening and an effective amount in an amount of 0.05 to 20 percent by weight based on weight of shortening of sodium stearyl fumarate.

47. A shortening composition consisting essentially of triglyceride shortening and an effective amount in an amount of 0.05 to 20 percent by weight based on weight of shortening of mono stearyl fumaric acid ester.

48. A shortening composition consisting essentially of triglyceride shortening and an effective amount in an amount of 0.05 to 20 percent by weight based on weight of shortening of sodium stearyl glutarate.

49. A shortening composition consisting essentially of triglyceride shortening and an effective amount in an amount of 0.05 to 20 percent by weight based on weight of shortening of mono stearyl glutaric acid ester.

References Cited

UNITED STATES PATENTS 3,145,109  8/1964  Howard _____ 99—118

FOREIGN PATENTS 652,006  4/1951  Great Britain.

RAYMOND N. JONES, *Primary Examiner.*

UNITED STATES PATENT OFFICE
CERTIFICATE OF CORRECTION

Patent No. 3,360,375                                December 26, 1967

Bruce D. Buddemeyer et al.

It is hereby certified that error appears in the above numbered patent requiring correction and that the said Letters Patent should read as corrected below.

Column 1, line 12, beginning with "Yeast leavened" strike o all to and including "dicarboxylic acid.", in line 16, same col 1 and insert instead -- Yeast leavened bakery products having incorporated therein about 0.05 to 2.0 percent and shortening compositions having incorporated therein about 0.05 to 20.0 percent by weight of a non-toxic, mono alkyl ester of a dicarboxylic acid. --; line 49, after "is" insert -- a --; column 2, line 6, for "tody's" read -- today's --; column 3, line 67, for "$C_{1\ 37}OH$" read -- $C_{18}H_{37}OH$ --; column 4, line 28, for "mon-este read -- mono-ester --; line 49, for "tthe" read -- the --; colu 6, line 31, for "arichidyl" read -- arachidyl --; line 52, for "creamed color" read -- cream colored --; column 13, in the las table, second column, last line thereof, insert -- 3.0 --; colu 14, line 36, for "scales" read -- scaled --; columns 15 and 16, TABLE I, opposite "Compound Level", under column "S.Seb.A." for "1.5%" read -- 0.5% --; same table, opposite "Peak (min.)", under column "S.Seb.A." for "6.5" read -- 5.6 --; same table, opposit "Departure (min.)", under column "S.A.A." for "9.6" read -- 9.5 same table, first column, lines 12 and 13 thereof, for "Percent Farinograph-Improvement" read -- Farinograph-Percent Improvemen --; same table, opposite "Departure (Percent Improvement)", under column "S.Seb.A." for "+42.0" read -- +42.8 --; TABLE II, oppos "Bake Type", under first column "S.F.A." for "Con. Cont." read -- Com. Cont. --; same table, opposite "Volume, cu. in.", under firs column "S.G.A." for "102" read -- 182 --; columns 17 and 18, TABLE III, opposite "Volume", under first column "S.G.A." for "+3.5" read -- +3.8 --; column 17, line 30, for "load" read -- loaf --; column 18, line 70, for "toal" read -- total --; columr 19, line 21, for "rates" read -- levels --; column 21, line 47, for "there" read -- thereof --; column 24, line 60, after "thereof" insert a comma; line 71, after "ester" insert -- of --

Signed and sealed this 22nd day of July 1969.

(SEAL)
Attest:

EDWARD M. FLETCHER, JR.                          WILLIAM E. SCHUYLER, JR.
Attesting Officer                                         Commissioner of Patents